United States Patent

[11] 3,596,853

| [72] | Inventor | Charles G. Anderson<br>Carlisle, Ohio |
|---|---|---|
| [21] | Appl. No. | 851,152 |
| [22] | Filed | Aug. 13, 1969 |
| [45] | Patented | Aug. 3, 1971 |
| [73] | Assignee | The United States of America as represented by the United States Atomic Energy Commission |

[54] SPACE HEAT SOURCE
6 Claims, 5 Drawing Figs.

[52] U.S. Cl. .................................................. 244/1 SS, 102/105
[51] Int. Cl. ....................................................... B64g 1/00
[50] Field of Search ........................................... 244/1 SS, 138, 113; 102/105; 263/50

[56] References Cited
UNITED STATES PATENTS

| 3,286,951 | 11/1966 | Kendall | 244/1 (S.S.) |
| 3,421,714 | 1/1969 | Koerner | 244/1 (S.S.) |
| 3,512,736 | 5/1970 | Weber et al. | 244/1 (S.S.) (C) |

*Primary Examiner*—Milton Buchler
*Assistant Examiner*—Jeffrey L. Forman
*Attorney*—Roland A. Anderson

ABSTRACT: A space capsule including heat source devices individually recoverable in which each heat source device includes a combined pyramidal-type reentry body and heat reflector and a radioisotopic heat source disposed in a hollow or concave portion of the body.

PATENTED AUG 3 1971  3,596,853
FIG. 1
FIG. 2
FIG. 3
FIG. 4
FIG. 5
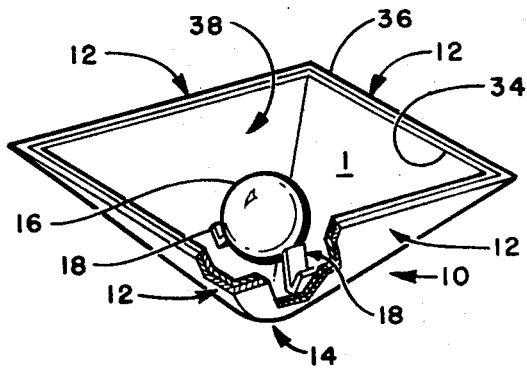
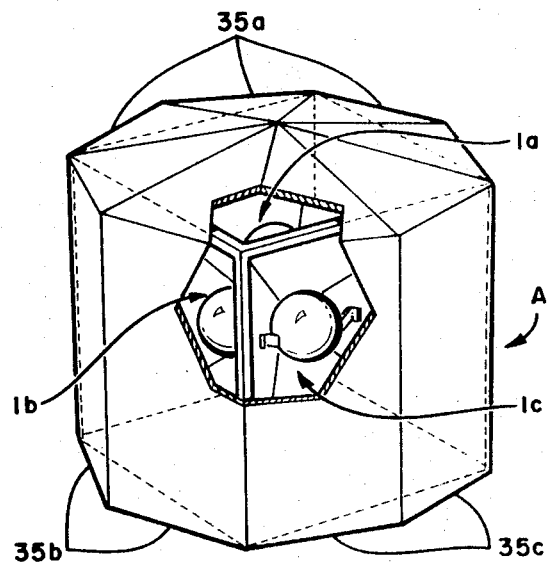
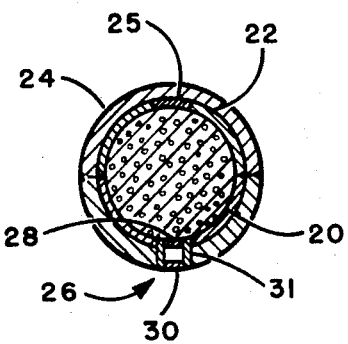
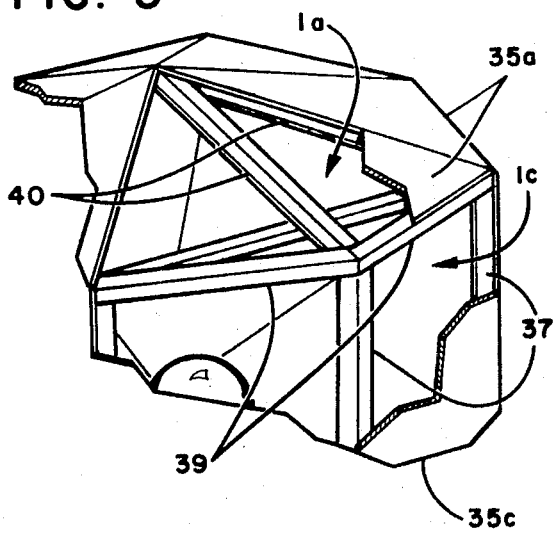
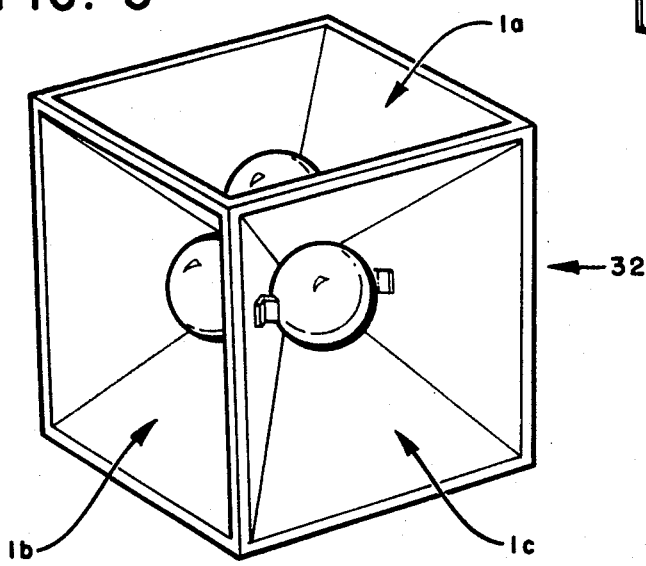
INVENTOR.
CHARLES G. ANDERSON
BY 3,596,853

SPACE HEAT SOURCE

BACKGROUND OF INVENTION

Reliable, long life heat sources, particularly radioisotopic heat sources, have a wide range of uses in space applications. Such heat sources may be used to provide thermal energy for electrical generating systems including thermoelectric or conventional Carnot cycle generators and for direct or indirect heating of personnel or equipment. When these heat sources are returned from space, there may be problems associated with reentry of the heat sources.

Present space radioisotopic heat source reentry may be handled in a number of ways. For example, the heat source may be returned to earth in a reentry vehicle or body surrounding the entire space vehicle or a portion of it including other apparatus than the heat source. The radioisotope in the heat source may then be recovered and reused or suitably disposed of. Because of the high cost of reentry bodies or vehicles and their inherently large weight and size, this approach in many instances can be very costly, especially in those space vehicles where most, if not all, of the other apparatus in the vehicle may be in terms of economics disposable during reentry. It would be advantageous to provide a low cost reentry body or vehicle which automatically or inherently assumes a reentry reentry, attitude, reaches a relatively slow impact velocity and may exhibit at least some buoyancy if impact occurs in water. Another approach is to permit burn up of the entire space vehicle during reentry, including the radioisotopic materials. The radioisotopic materials in such instances may be dispersed in the atmosphere and thus create an undesirable hazard and environmental contamination.

SUMMARY OF INVENTION

In view of the limitations of the prior art as noted above, it is an object of this invention to provide a radioisotope fueled heat source device including its own efficient low cost and lightweight reentry shield or body.

It is a further object of this invention to provide a reentry recoverable, radioisotope fueled, space heat source device which may be easily combined with similar heat source devices in an efficient heat source capsule.

It is a further object of this invention to provide a space capsule including a plurality of individually recoverable radioisotope fueled heat sources.

Various other objects and advantages will appear from the following description of embodiments of the invention, and the most novel features will be particularly pointed out hereinafter in connection with the appended claims.

The invention comprises a heat source device including a radioisotopic heat source and a combined heat reflector and reentry heat shield for the heat source in a form permitting use of more than one heat source device in a combined space capsule.

DESCRIPTION OF DRAWING

Various embodiments and modifications of the present invention are illustrated in the accompanying drawing wherein:

FIG. 1 is a partially cutaway perspective view of a heat source device incorporating features of this invention;

FIG. 2 is a cross-sectional view of a spherical radioisotopic heat source;

FIG. 3 is a perspective view of an arrangement of a plurality of the heat source devices shown in FIG. 1;

FIG. 4 is a partially cutaway perspective view of the arrangement of FIG. 3 showing its use as a heat source space capsule;

FIG. 5 is an expanded fragmentary view, partially broken away, of the portion designated by A of FIG. 4 showing supporting structure for the capsule of FIG. 4.

DETAILED DESCRIPTION

In FIG. 1, the heat source device 1 of this invention may include a member 10 formed from generally pyramidal sides or walls 12 converging to a curved or closed arcuate end portion 14 adjacent the apex of the pyramidal walls. A radioisotopic heat source 16, in the form of a sphere as shown or other convenient shape, may be mounted inside walls 12 adjacent end portion 14 and the apex of walls 12 by suitable mounts or brackets 18.

Brackets 18 may be suitably fastened to and positioned on walls 18 adjacent end portion 14 so as to locate the center of gravity of heat source device 1 between the center of gravity of member 10 and end portion 14. With the center of gravity so located and with the aerodynamic configuration presented by member 10, heat source device 1 may exhibit inherent drag stability and orient or reorient itself to a proper reentry attitude with end portion 14 leading the reentry trajectory regardless of the initial reentry orientation. This center of gravity location and the general shape of member 10 also provides an aerodynamic body having a relatively slow rate of fall in the atmosphere and a floatable body in water.

A heat source 16 is illustrated with more detail in FIG. 2 and may include a central core or fuel 20 of some desired radioactive isotope enclosed by a liner 22 and an outer containment shell 24. Fuel 20 may be an alloy or compound of a radioisotope such as plutonium–238, polonium–210, or americium–241 which may be suitably disposed in liner 22 through any appropriate means such as a filler cap 25. The liner 22 may be made of any desired materials which are compatible with the radioisotope fuel under the operating conditions of heat source 16. With a fuel such as plutonium–238 as an alloy or as $PuO_2$, liner 22 may be made of tantalum. Shell 24 may be made in one or two pieces of the same or similar materials such as tantalum, or alloys thereof or stainless steel.

Fuel 20 may be suitably processed or formed into a single member or into particles or spheres and pressed into the desired form, such as spherical as shown. The finished fuel may be provided with level of porosity to permit accumulation of helium resulting from the decay process or, liner 22 and shell 24 may include a suitable venting device 26 having an inner vent 28 and outer vent 30 enclosed within a tubular member 31. The vents should have sufficient porosity to permit helium to escape while blocking any larger molecules or particles to prevent radioactive contaminants from escaping. The various liners, shells and vents may be separately formed and then welded or otherwise fastened together into a single unit by any conventional techniques.

Returning to FIG. 1, each of the walls 12 of member 10 may include an inner portion 34, which provides structural support for the heat source device, and an outer coating or layer 36 made of some ablative or other type of heat resistant and heat dissipative material suitable as a reentry shield. Layer 36 may be formed such as by casting, pressing, troweling or spraying such materials as certain ceramics like boron nitride, zirconia, alumina, or of carbon or graphite. Layer 36 might be a composite having a heat and oxidation resistant cover over a substrate of thermal insulation. Insulation may be desirable between the outer coat and the metal substrate. Layer 36 should extend over the entire outer surface of walls 12 including end portion 14 with a thickness adequate to withstand reentry temperatures.

The interior surface 38 of inner portion 34 may be coated or finished to provide a high level of reflectivity and direct the heat emanating from radioisotope heat source 16 towards the open end of member 10 and any utilization device or apparatus positioned thereat.

Member 10 may be formed in any convenient pyramidal, or conical or hyperbolic, shape depending on the desired application of the heat source device. There are many applications where it may be desirable to provide a heat source which emits heat uniformly in all or almost all directions for convenience of packaging and for size and weight considerations. In such applications, a plurality of heat source devices may be arranged in a symmetrical, possibly a geometric shape, configuration with all heat source devices directed outwardly from a central location. The symmetrical configuration and geometrical shape presented may depend upon the relative dimensions of height and the open end of the pyramidal or conical member.

FIG. 3 illustrates a cubical configuration of six heat source devices, with devices 1a, 1b and 1c shown, using pyramidal heat source devices with equal square bases and appropriate equal heights. Each heat source device 1a, 1b and 1c (as well as the three not shown) may include the same general construction and features of heat source device 1 in FIG. 1. Such a configuration provides an overall heat source capsule 32 which may generate and emit uniform heat energy in all directions.

This heat energy may be utilized by any appropriate means for receiving and absorbing heat distributed in a symmetrical manner about capsule 32 and adjacent the base of each heat source device, such as with suitable rectangular and the like panels as shown in FIG. 4. The number, size and shape of the panels may be selected in most applications to provide a uniform or near uniform temperature over the entire surface of each panel, particularly in those applications where each panel is made up of or includes thermoelectric or the like electrical generators (not shown) distributed thereabout. In the arrangement shown, two rectangular panels for each heat source device (panels 35b and 35c) arranged about an axis of capsule 32 may be positioned in an generally octagonal shape. The remaining heat source devices, such as device 1a, may be enclosed by similar rectangular panels leaving some end portions partially open or by a symmetrical arrangement of triangular panels 35a in the form of a pyramidal end member. It will be apparent that each of the respective panel shapes may be identically formed with the same utilization means or with different utilization means to provide different outputs or functioning.

In many applications an arrangement may be preferred in which the individual heat source devices 1a, 1b, 1c, etc., are separable from each other to permit separate reentry of each device. This capability may be provided with conventional radio controlled or automatic separation devices or other well-known techniques. However, for purpose of simplicity of design, operation and reliability, it may be desirable that the heat source devices separate with a completely passive system without any required external or remote initiation. Such a passive separating system may be provided by the capsule arrangement shown in FIG. 4 and illustrated in detail in FIG. 5.

In such a system, the individual heat source devices may be suspended or placed unattached within a frame formed by the panels or within a frame to which the panels are fastened or attached. A suitable frame may include angle brackets at each of the intersections of panels 35a, 35b and 35c with each adjacent panel as shown by brackets 37, 39 and 40. Each of the angle brackets and panels (together with any utilization means or portions thereof disposed thereabout) may be formed of suitable materials and designed to disintegrate, partially melt, or break away at elevated temperatures occurring at an early point during reentry. Upon break up of the supporting frame and panels the individual heat sources may then be separated from each other by the reentry forces and permitted to assume their separate reentry attitudes.

With a 14-inch cubed capsule, such as shown in FIGS. 3 and 4, having six radioisotopic heat sources with a total of about 1,750 grams of plutonium-238 and a total weight of about 11.2 pounds (including heat sources, heat source supports and pyramidal members), approximately 700 thermal watts may be available at the enclosing panels for an operating temperature of about 1,040° F. depending upon the electric panel external insulation. With conventional thermoelectric utilization devices distributed over the panels, electrical power output of about 30 to 60 watts may be achieved. Each heat source device, after reentry, may impact against earth at a velocity of about 25—41 feet per second (17 to 28 miles per hour).

The present invention thus provides novel heat source devices and heat source capsules which are simple in design and construction with low weight. The heat source devices and capsules may be utilized in a wide range of space applications where such simplicity and low weight is desirable without radioisotopic contamination of the earth's atmosphere.

It will be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. A heat source capsule recoverable from space comprising a plurality of heat source devices, each heat source device including a heat reflector having generally pyramidal walls diverging from an apex portion and terminating at a base portion, a radioisotopic heat source, means for mounting said radioisotopic heat source within confines of said pyramidal walls adjacent said apex portion and reentry heat shield material disposed at outer surfaces of said pyramidal walls; means for suspending said heat source devices in a symmetric array about said apex portions with outwardly projecting base portions; and means mounted adjacent said base portions for receiving and absorbing heat from said radioisotopic heat sources.

2. The capsule of claim 1 wherein said reflector walls converge to a closed arcuate surface.

3. The capsule of claim 1 wherein said heat shield includes a heat dissipative coating.

4. The capsule of claim 3 wherein said coating is a ceramic

5. The capsule of claim 1 wherein said suspending means is made of a material which disintegrates during reentry releasing said heat source devices for separate reentry.

6. The capsule of claim 1 wherein said array is in a geometrically symmetrical form.